(12) United States Patent
Patel et al.

(10) Patent No.: US 11,627,482 B2
(45) Date of Patent: Apr. 11, 2023

(54) REPEATER WITH INTEGRATED MODEM FOR REMOTE MONITORING

(71) Applicant: WILSON ELECTRONICS, LLC, St. George, UT (US)

(72) Inventors: Ilesh V. Patel, Euless, TX (US); Glen Raggio, Mesquite, TX (US); Dale Robert Anderson, Colleyville, TX (US); Christopher Ken Ashworth, St. George, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/383,233

(22) Filed: Apr. 12, 2019

(65) Prior Publication Data

US 2019/0327625 A1    Oct. 24, 2019

Related U.S. Application Data

(60) Provisional application No. 62/660,052, filed on Apr. 19, 2018.

(51) Int. Cl.
  *H04W 24/08* (2009.01)
  *H04B 7/155* (2006.01)
  *H04W 16/26* (2009.01)

(52) U.S. Cl.
  CPC ........ *H04W 24/08* (2013.01); *H04B 7/15535* (2013.01); *H04B 7/15578* (2013.01); *H04W 16/26* (2013.01)

(58) Field of Classification Search
  CPC .. H04W 24/08; H04W 16/26; H04B 7/15578; H04B 7/15535
  See application file for complete search history.

(56) References Cited

U.S. PATENT DOCUMENTS

| 4,776,032 A | 10/1988 | Odate et al. | |
| 4,849,963 A * | 7/1989 | Kawano | H04B 7/15542 370/279 |

(Continued)

FOREIGN PATENT DOCUMENTS

| EP | 1525678 B1 | 7/2008 |
| WO | WO 2008/059486 A2 | 5/2008 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

(Continued)

*Primary Examiner* — Yuwen Pan
*Assistant Examiner* — Fatuma G Sherif
(74) *Attorney, Agent, or Firm* — Thorpe North & Western, LLP

(57) ABSTRACT

A technology is described for a bi-directional amplifier remote monitoring system. A directional coupler can have a first port, a second port, and a third port. The first port can be configured to be coupled to a bi-directional amplifier first port. The second port can be configured to be coupled to a server antenna port. The third port can be configured to be coupled to a wireless modem. The directional coupler can be configured to direct a downlink signal with a selected amount of attenuation from the bi-directional amplifier first port to the wireless modem. The directional coupler can be configured to direct a modem signal with the selected amount of attenuation from the wireless modem to the bi-directional amplifier first port for communication on an uplink path of the bi-directional amplifier.

29 Claims, 7 Drawing Sheets

(56) References Cited

U.S. PATENT DOCUMENTS

| | | | |
|---|---|---|---|
| 5,303,395 A | 4/1994 | Dayani | |
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 9,788,274 B2 | 10/2017 | Cook et al. | |
| 2002/0028655 A1 | 3/2002 | Rosener et al. | |
| 2002/0044594 A1 | 4/2002 | Bongfeldt | |
| 2003/0040329 A1* | 2/2003 | Yona | H04W 88/085 455/507 |
| 2003/0123401 A1* | 7/2003 | Dean | H04W 52/08 370/318 |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill. | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2011/0151775 A1 | 6/2011 | Kang et al. | |
| 2013/0072142 A1* | 3/2013 | Akula | H04B 1/005 455/129 |
| 2018/0234162 A1 | 8/2018 | Kim | |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50—8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; (2001); Data Sheet; 218 pages.

* cited by examiner

REPEATER WITH INTEGRATED MODEM FOR REMOTE MONITORING

RELATED APPLICATIONS

The present application claims the benefit of U.S. Provisional Patent Application No. 62/660,052 filed Apr. 19, 2018, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
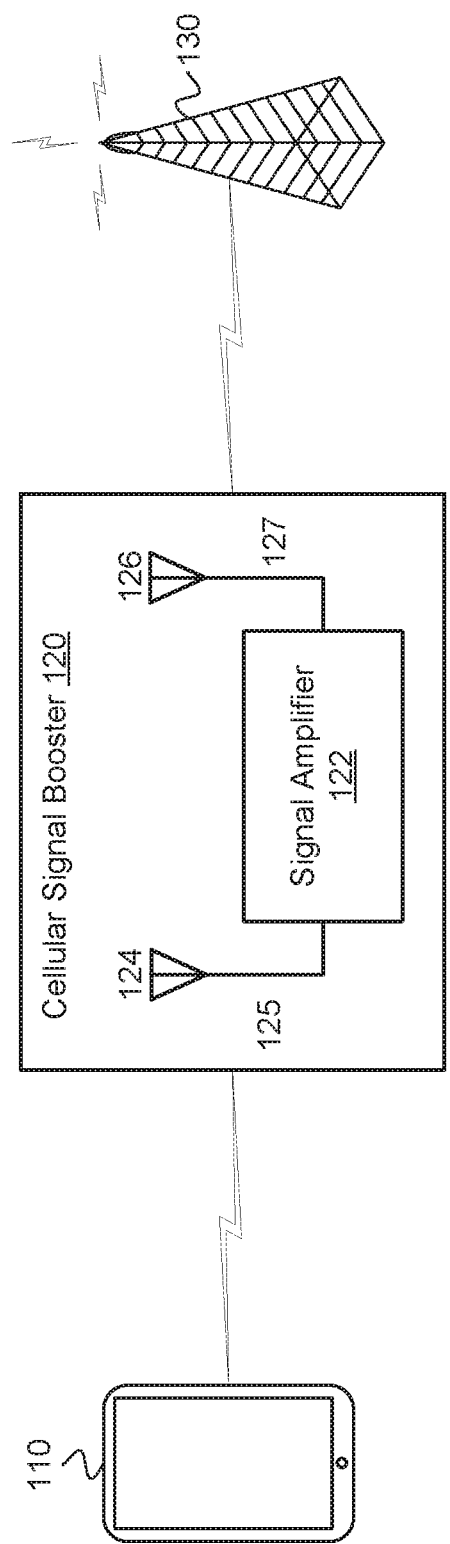
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

After installation of a signal booster, repeater, or bi-directional amplifier (BDA) it can be difficult to determine the status of the signal booster, repeater, or bi-directional amplifier without using remote monitoring. Without remote monitoring, a technician may need to return to the location where the signal booster, repeater, or BDA has been installed in order to fix any problems with the signal booster, repeater, or BDA. This presents a few problems: first, the signal booster, repeater, or BDA may be non-functional for an extended period of time before it can be determined that the signal booster, repeater, or BDA is non-functional; second, it can be more costly and time-consuming to have a technician diagnose and fix any problems with the repeater; third, the signal booster, repeater, or BDA may incur significant downtime while the technician is repairing the non-functional booster, repeater, or BDA.

A modem, which can be a certified wireless modem, can be used for remote monitoring of the signal booster, repeater, or BDA. In one embodiment, a modem can be communicatively coupled between an indoor (server) antenna and a multiplexer (splitter, duplexer, circulator, etc.), using a one or more of a coupler and an antenna, to allow the modem to transmit information from a BDA control circuit and communicate information to the BDA control circuit. There are advantages with placing the modem at this location in comparison to other locations where the modem could be placed as will be described in proceeding paragraphs.

Using a modem can provide awareness of non-functional or improperly performing BDAs and can efficiently address problems out in the field. This can reduce the associated downtime of the BDA. For purposes of this application, BDA is synonymous with repeater and signal booster, and all three terms can be used interchangeably.

FIG. 1 illustrates an exemplary signal booster 120 in communication with a wireless device 110 and a base station 130. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include a device antenna 124 (e.g., an inside antenna or server antenna or a coupling antenna) and a node antenna 126 (e.g., an outside antenna or donor antenna). The device antenna 124 and/or the node antenna can be integrated. The node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the device antenna 124 via a first coaxial cable 125 or other type of radio frequency connection operable to communicate radio frequency signals. The device antenna 124 can wirelessly communicate the downlink signal that has been amplified and filtered to the wireless device 110.

Similarly, the device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the node antenna 126 via the second coaxial cable 127 or other type of radio frequency connection operable to communicate radio frequency signals. The node antenna 126 can communicate the uplink signal that has been amplified and filtered to a node, such as base station 130.

In one example, the signal booster 120 can send uplink signals to a node and/or receive downlink signals from the node. While FIG. 1 shows the node as a base station 130, this is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the signal booster 120 can include a battery to provide power to various components, such as the signal amplifier 122, the device antenna 124 and the node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R.

The signal booster 120 can be configured to automatically self-monitor its operation to ensure compliance with applicable noise and gain limits. The signal booster 120 can either self-correct or shut down automatically if the signal booster's operations violate the regulations defined in 47 CFR Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the 3GPP Long Term Evolution (LTE) Release 8, 9, 10, 11, 12, 13, 14, 15, or 16, and 3GPP Release 15 fifth generation (5G) Release 15 or 16. In one configuration, the signal booster 120 can boost signals for 3GPP LTE Release 16.1.0 (March 2019) or other desired releases. The signal booster can also operate on the frequency bands recited in the Third Generation Partnership Project (3GPP) Technical Specification (TS) 36.104 (Release 16 Mar. 2019). The frequency bands include, but are not limited to, Evolved Universal Mobile Telecommunications System (UMTS) Terrestrial Radio Access operating bands 1-76 that are recited in Table 5.5-1 3GPP TS 36.104, Version 16.1.0 (2019-03).

In another configuration, the signal booster 120 can boost signals from the 3GPP Technical Specification (TS) 38.104 (Release 15 Mar. 2019) bands or 5G frequency bands. In addition the signal booster 120 can boost selected frequency bands based on the country or region in which the signal booster is used, including any of bands n1-n86, n257-n261, or other bands, as disclosed in 3GPP TS 38.104 V15.5.0 (2019-03).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

After installation of a signal booster, repeater, or bi-directional amplifier (BDA) it can be difficult to determine the status of the signal booster, repeater, or bi-directional amplifier without using remote monitoring. A modem, which can be a certified wireless modem, can be used for remote monitoring of the signal booster, repeater, or bi-directional amplifier. Using a modem can provide awareness of non-functional or improperly performing BDAs and can efficiently address problems out in the field. This can reduce the associated downtime of the BDA.

Figure 2:
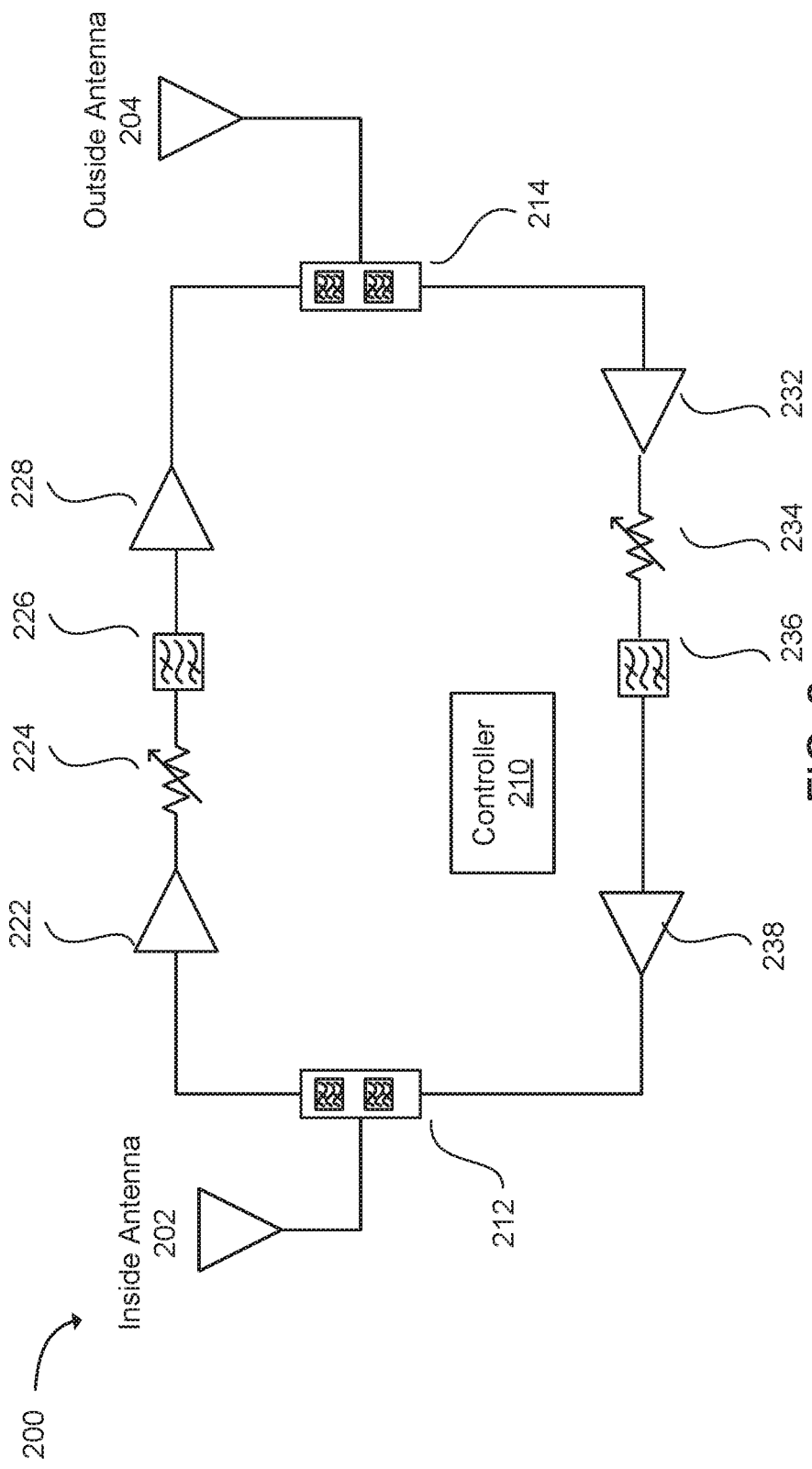
FIG. 2 illustrates a bi-directional amplifier in accordance with an example.

As illustrated in FIG. 2, a repeater can comprise an inside antenna 202 and an outside antenna 204. The inside antenna can be coupled to a diplexer or duplexer 212. The outside antenna can be coupled to a diplexer or duplexer 214. A first path can comprise a low noise amplifier (LNA) 222, a variable attenuator 224, a filter 226, and a power amplifier (PA) 228. The LNA 222 can amplify a low power signal with minimal degradation of the signal to noise ratio of the low power signal. A PA 228 can adjust and amplify the power level of the low power signal by a desired amount. A second path can comprise an LNA 232, a variable attenuator 234, a filter 236, and a PA 238. The first path can be a downlink amplification path or an uplink amplification path. The second path can be a downlink amplification path or an uplink amplification path. The repeater 200 can also comprise a controller 210. In one example, the controller 210 can include one or more processors and memory.

Figure 3:
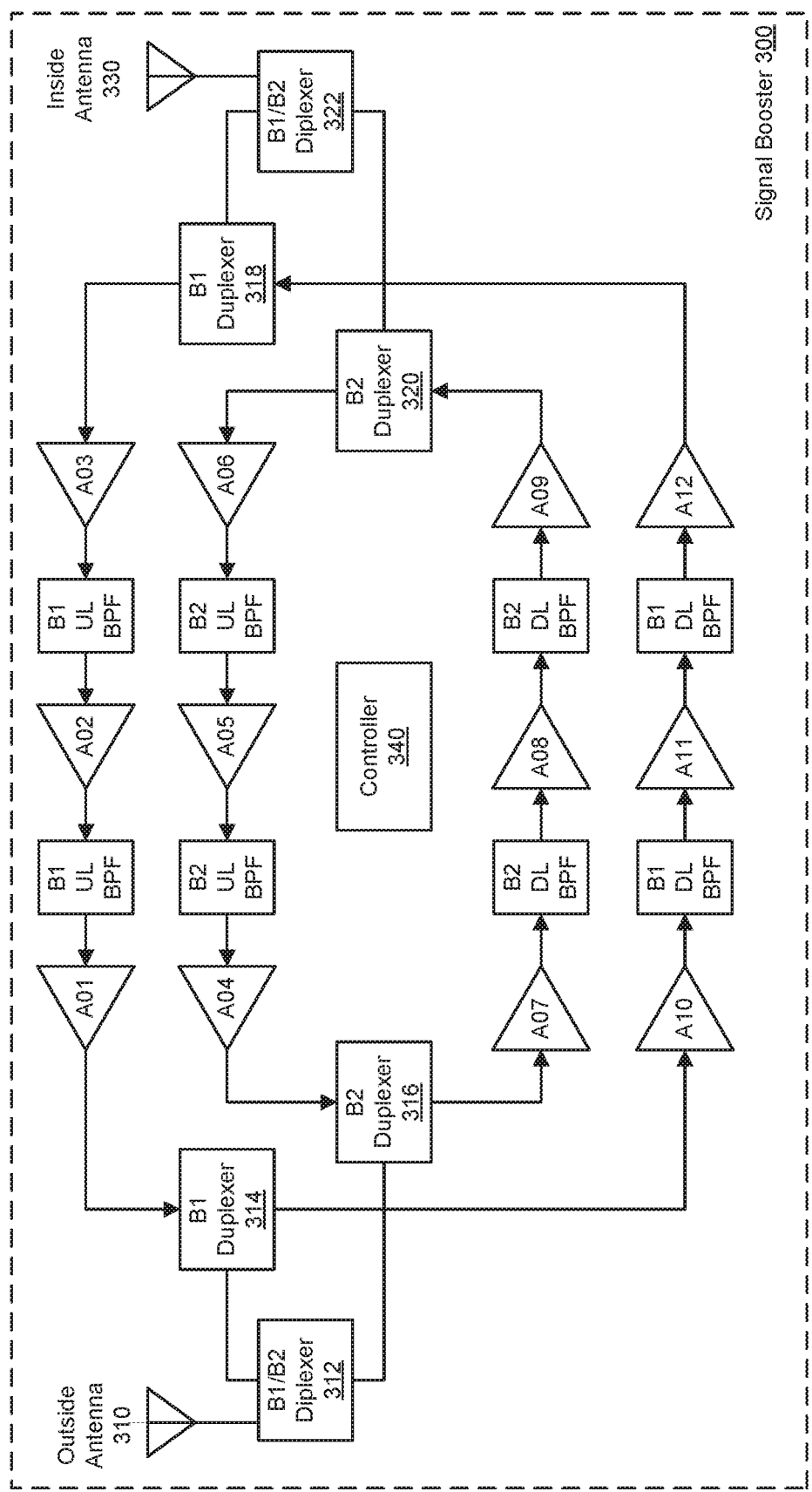
FIG. 3 illustrates a multi-band bi-directional amplifier in accordance with an example.

As illustrated in FIG. 3, in another example, a repeater can be a multiband bi-directional wireless signal booster 300 configured to amplify an uplink signal and a downlink signal in multiple bands using a separate signal path for each uplink frequency band and downlink frequency band. In one embodiment, adjacent bands can be included on a same signal path.

An outside antenna 310, or an integrated node antenna, can receive a downlink signal. For example, the downlink signal can be received from a base station. The downlink signal can be provided to a first B1/B2 diplexer 312, wherein B1 represents a first frequency band and B2 represents a second frequency band. The first B1/B2 diplexer 312 can direct selected portions of a received signal to a B1 downlink signal path and a B2 downlink signal path. Therefore, a downlink signal that is associated with B1 can travel along the B1 downlink signal path to a first B1 duplexer 314. A portion of the received signal that is within the B2 band can travel along the B2 downlink signal path to a first B2 duplexer 316. After passing the first B1 duplexer 314, the downlink signal can travel through a series of amplifiers (e.g. A10, A11, and A12) and downlink bandpass filters (BPF) to a second B1 duplexer 318. In addition, the B2 downlink signal passing through the B2 duplexer 316, can travel through a series of amplifiers (e.g. A07, A08, and A09) and downlink band pass filters (BPF) to a second B2 duplexer 320. At this point, the downlink signals (B1 or B2) have been amplified and filtered in accordance with the type of amplifiers and BPFs included in the multiband bi-directional wireless signal booster 300. The downlink signals from the second B1 duplexer 318 or the second B2 duplexer 320, respectively, can be provided to a second B1/B2 diplexer 322. The second B1/B2 diplexer 322 can direct the B1/B2 amplified downlink signal to an inside antenna 330, or an integrated device antenna. The inside antenna 330 can communicate the amplified downlink signal to a wireless device, such as a UE.

In another example, the inside antenna 330 can receive an uplink (UL) signal from a wireless device. The uplink signal can include a Band 1 signal and a Band 2 signal. The uplink signal can be provided to the second B1/B2 diplexer 322. The second B1/B2 diplexer 322 can direct the signals, based on their frequency, to a B1 uplink signal path and a B2 uplink signal path. Therefore, an uplink signal that is associated with B1 can travel along the B1 uplink signal path to a second B1 duplexer 318, and an uplink signal that is associated with B2 can travel along the B2 uplink signal path to a second B2 duplexer 320. The second B1 duplexer 318 can direct the B1 uplink signal to travel through a series of amplifiers (e.g. A01, A02, and A03) and uplink bandpass filters (BPF) to the first B1 duplexer 314. In addition, the second B2 duplexer 320 can direct the B2 uplink signal to travel through a series of amplifiers (e.g. A04, A05, and A06) and downlink band pass filters (BPF) to the first B2 duplexer 316. At this point, the uplink signals (B1 and B2) have been amplified and filtered in accordance with the type of amplifiers and BPFs included in the bi-directional wireless signal booster 300. The uplink signals from the first B1 duplexer 314 and the first B2 duplexer 316, respectively, can be provided to the first B1/B2 diplexer 312. The first B1/B2 diplexer 312 can direct the B1 and B2 amplified uplink signals to the outside antenna 310, or an integrated device antenna. The outside antenna 310 can communicate the amplified uplink signals to a base station.

Figure 4:
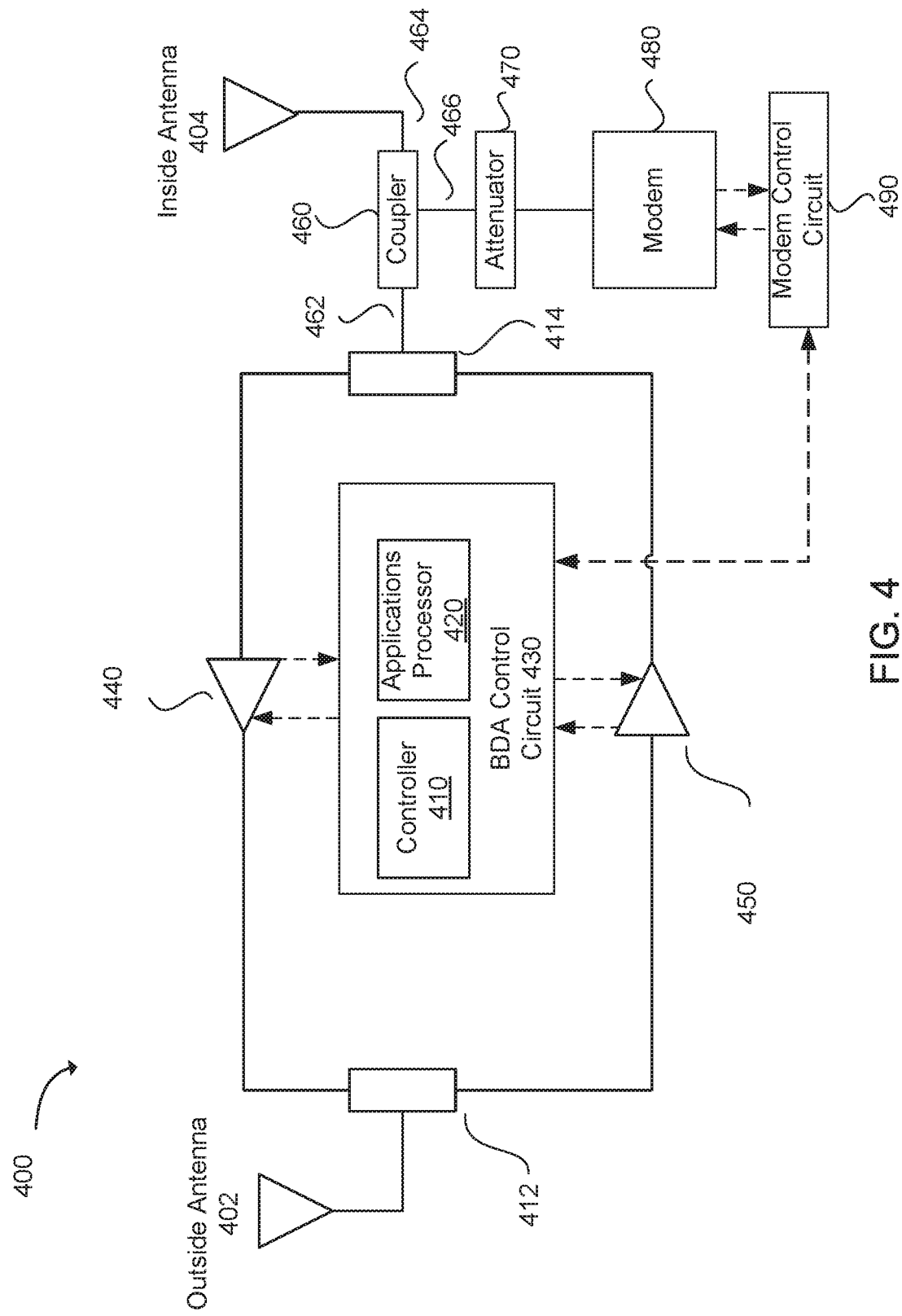
FIG. 4 illustrates a bi-directional amplifier remote monitoring system in accordance with an example.

As illustrated in FIG. 4, in another example, a bi-directional amplifier remote monitoring system can comprise an inside antenna 404 and an outside antenna 402. The inside antenna 404 can be coupled to a diplexer or duplexer or multiplexer 414. The outside antenna can be coupled to a diplexer or duplexer or multiplexer 412. The solid lines in FIG. 4 are signal lines and the dashed lines in FIG. 4 are sensing and control lines.

In another example, a first amplification path 450 can comprise a low noise amplifier (LNA), a variable attenuator, a bandpass filter, and a power amplifier (PA). The LNA can amplify a low power signal while minimally degrading the signal to noise ratio. A PA can adjust and amplify the power level by a desired amount. A second amplification path 440 can comprise an LNA, a variable attenuator, a bandpass filter, and a PA. The first path can be a downlink amplification path or an uplink amplification path. The second path can be a downlink amplification path or an uplink amplification path.

In another example, the bi-directional amplifier remote monitoring system can also comprise a bi-directional amplifier (BDA) control circuit 430. The BDA control circuit can comprise a controller 410 and an applications processor 420. The controller 410 can comprise one or more processors and memory. The applications processor 420 can be configured to provide monitoring information via a wireless modem or an Ethernet interface for wired monitoring. The monitoring information can include, but is not limited to: baseband data packets, firmware version information (e.g. application processor, booster RF processor, modem), booster identification information (e.g. serial number or model number), user configuration information (e.g. network preference), heartbeat information (e.g. a signal sent periodically, such as every 1, 5, or 15 minutes, or another desired periodicity), a radio frequency (RF) status, path status information (e.g. information regarding full gain, automatic gain control (AGC), oscillation, or shutdown), path output power, downlink path received signal strength indicator (RSSI), band oscillation count, uptime (i.e. time since booster powered on), oscillation status, alerts, power reset information, oscillation detected information, RF band shutdown detected information, hardware error detected information, AGC active information, remote configuration change information, local configuration change information, button press information, or other desired monitoring information. The BDA control circuit 430 can be electrically connected to send and receive sensing and control information on the downlink amplification path or the uplink amplification path.

In another example, the bi-directional amplifier remote monitoring system can also comprise a modem 480. The modem can be a wireless modem and can be configured to communicate via wireless local area networks (W-LANs), such as WiFi or Bluetooth, and wireless wide area networks (W-WANs), such as a cellular connection. The modem can be configured to be electrically connected to the bi-directional amplifier to enable the modem to send data to the bi-directional amplifier and receive data from the bi-directional amplifier. The modem can be configured to be electrically coupled to a downlink of the bi-directional amplifier to receive LTE firmware over the air updates (FOTA) updates.

In another example, the modem 480 can be configured to include a modem control circuit 490. The modem control circuit 490 can be configured to communicate sensing and control information with the BDA control circuit 430. The BDA control circuit 430 can be configured to communicate sensing and control information with the modem control circuit 490.

In another example, the bi-directional amplifier remote monitoring system can also comprise a directional coupler 460. The directional coupler 460 can have a first port 462, a second port 464, and a third port 466. The first port 462 can be configured to be coupled to a bi-directional coupler first port. The second port 464 can be configured to be coupled to a server antenna port or inside antenna port 404. The third port 466 can be configured to be coupled to the modem 480.

In another example, the directional coupler 460 can be configured to direct a downlink signal with a selected amount of attenuation from the bidirectional amplifier first port 462 to the modem 480. The downlink signal can be communicated on a downlink path of the bi-directional amplifier 400 to the coupler 460.

In another example, the directional coupler 460 can be configured to direct a modem signal with a selected amount of attenuation from the modem 480, through the coupler 460, to the bi-directional amplifier first port 462 for communication on an uplink path of the bi-directional amplifier. The modem signal can be communicated from the second amplification path 440 to the applications processor 420 and/or controller 410 in the BDA control circuit 430. The modem signal can be coupled with a selected amount of attenuation from the modem 480 with an uplink signal of the bi-directional amplifier 400 at a repeater first port 414 for communication via an uplink path of the bi-directional amplifier 400 for transmission to a base station. The modem signal transmitted to the base station can include the monitoring information discussed in the preceding paragraphs. The monitoring information can be received at the base station and routed to a predetermined location (i.e. a cell phone or computer). In one example, the monitoring information can be stored on a server located in a cloud computing environment. The monitoring information can then be accessed by individuals having the security rights to access the monitoring information on the server.

In another example, the directional coupler 460 can provide a selected amount of attenuation on the path between the first port and the third port. The coupler typically allows substantially all of a signal along a certain path—such as from the multiplexer 414 to the inside antenna 404 to be passed with minimal loss. A very small amount of the signal can be tapped off by the coupler and sent along the path to the modem 480. The attenuator can be used to provide additional attenuation if the signal from the coupler 460 has more power than desired. The directional coupler 460 can be configured to couple a downlink signal, that is received from a base station, from the repeater first port 414 to the modem 480. The downlink signal can be coupled with a selected amount of attenuation. The downlink signal transmitted from the base station to the modem 480 can include the monitoring information discussed in the preceding paragraphs. The monitoring information may be sent from the server in the cloud location. The server may be the same server used to store information received on an uplink. Alternatively, the monitoring information can be sent from a different server or from a user equipment (UE) to the modem 480 for communication to the BDA control circuit 430.

The amount of attenuation can comprise a quantity substantially equal to 20 decibels (dB). In another example, the coupled signal can be attenuated by an amount greater than 10 dB.

In another example, an attenuator 470 can be coupled between the third port of the directional coupler and the modem 480 to provide a selected amount of attenuation of the modem signal or the downlink signal. The amount of attenuation can comprise a quantity substantially equal to 20 dB or an amount greater than 10 dB.

In another example, the total amount of attenuation provided by the directional coupler 460 and the attenuator 470 can be selected to exceed a mobile station coupling loss (MSCL), which is the path loss between the inside antenna and a user equipment (UE). The total amount of attenuation can be selected to exceed 40 dB, or another desired threshold, so that the overall attenuation from the coupler 460 and the attenuator is greater than the MSCL. This can prevent the modem from interfering with the operation of the bi-directional amplifier. This can also prevent the total amount of attenuation from capturing the AGC and affecting the signal to the UE.

In another example, the directional coupler 460 and/or the attenuator 470 can be configured to reduce a maximum gain of a downlink signal output from the repeater to a selected signal level gain between the directional coupler 460 and the wireless modem 480 in accordance with FCC regulations or another regulatory body. The amount of gain can be determined based on the type of repeater and use of the repeater. For example, the selected signal level gain of a stationary wireless repeater can be approximately 65-72 dB, as determined by the FCC, or another regulatory body. A mobile wireless repeater in a cradle can have a gain of 23 dB as determined by the FCC, or another regulatory body. A directly connected repeater can also have a maximum gain of 15 dB, as determined by the FCC or another regulatory body.

In another example, the directional coupler 460 can be further configured to substantially pass an uplink signal. The uplink signal can be received from the server antenna or inside antenna 404. The uplink signal can pass from the second port of the directional coupler to the first port of the directional coupler to enable the uplink signal to be communicated through the directional coupler to the bi-directional amplifier first port with minimal loss.

In another example, various devices might be used in place of the directional coupler including a splitter, a diplexer, or a circulator. However, a splitter can introduce 3 dB of loss on the paths of the bi-directional amplifier which can degrade the uplink noise figure and reduce the downlink power amplification. A diplexer in place of a directional coupler may not function correctly either because the modem may operate in the same frequency bands as the bi-directional amplifier. A circulator may also not function as desired, because the uplink signals from the inside antenna port or server port can feed directly into the path of the modem which may cause only the reflected energy to pass into the bi-directional amplifier. The directional coupler can minimize the through path loss while allowing communication through the bi-directional amplifier. The directivity of the coupler can minimize the reflection of the signal into the server port or inside antenna port.

In another example, the bi-directional amplifier can be configured to pass signals comprising a single band on the uplink or downlink paths. Alternatively, the bi-directional amplifier can be configured to pass signals comprising multiple bands on the uplink or downlink paths.

For example, the bi-directional amplifier can be configured to pass uplink frequencies in 3GPP LTE bands 12,13, 5, 25, and/or band 4. 3GPP LTE Band 12 uplink can include operating frequencies between 698 megahertz (MHz) and 716 MHz. 3GPP LTE Band 13 uplink can include operating frequencies between 776 MHz and 787 MHz. 3GPP LTE Band 5 uplink can include operating frequencies between 824 MHz and 849 MHz. 3GPP LTE Band 25 uplink can include operating frequencies between 1850 MHz and 1915

MHz. 3GPP LTE Band 4 uplink can include operating frequencies between 1710 MHz and 1755 MHz.

In another example, the bi-directional amplifier can be configured to pass downlink frequencies in 3GPP LTE bands 12, 13, 5, 25, or band 4. 3GPP LTE Band 12 downlink can include an operating band between 728 MHz and 746 MHz. 3GPP LTE Band 13 downlink can include an adjacent operating band between 746 MHz and 757 MHz. 3GPP LTE Band 5 downlink can include an operating band between 869 MHz and 894 MHz. 3GPP LTE Band 25 downlink can include an operating band between 11930 MHz and 1995 MHz. 3GPP LTE Band 4 downlink can include an operating band between 2110 MHz and 2155 MHz.

In another example, a bi-directional amplifier (BDA) can be integrated with remote monitoring capability. The BDA with remote monitoring capability can comprise a repeater with a first repeater port, a second repeater port, and a control circuit. The repeater can further comprise one or more uplink paths coupled between the first repeater port and the second repeater port. The repeater can further comprise one or more downlink paths coupled between the first repeater port and the second repeater port.

The BDA with remote monitoring capability can further comprise a wireless modem and a directional coupler. The directional coupler can have a first port, second port, and a third port. The first port can be configured to be coupled to the first repeater port. The second port can be configured to be coupled to a server antenna port. The third port can be configured to be coupled to the wireless modem.

The directional coupler and modem can be configured to be coupled to the server antenna port because this configuration can provide adequate power from the modem to a base station. Alternatively, if the directional coupler and modem were coupled to the donor antenna port, then there might be additional loss on the donor antenna port that can degrade the sensitivity of the bi-directional amplifier. When a modem is communicatively coupled between an outdoor (donor) antenna and a multiplexer (splitter, duplexer, circulator, etc.), using a one or more of a coupler and an antenna, then 20 decibels (dB) of power may be lost from the booster to the base station. In addition, communicatively coupling a modem between an outdoor (donor) antenna and a multiplexer (splitter, duplexer, circulator, etc.) can also introduce additional loss on the donor side of the signal booster, repeater, or BDA. The coupler can add additional pass-through loss because energy can be tapped off, which can increase the downlink noise figure.

The directional coupler can be configured to direct a downlink signal from the one or more downlink paths from the first repeater port to the wireless modem. The downlink signal can be attenuated by a selected amount. The directional coupler can be configured to direct a modem signal from the wireless modem to the first repeater port for communication on one or more uplink paths of the repeater. The modem signal can be communicated from the uplink path of the repeater to the applications processor and/or controller in the BDA control circuit. The modem signal can have a selected amount of attenuation.

Figure 5:
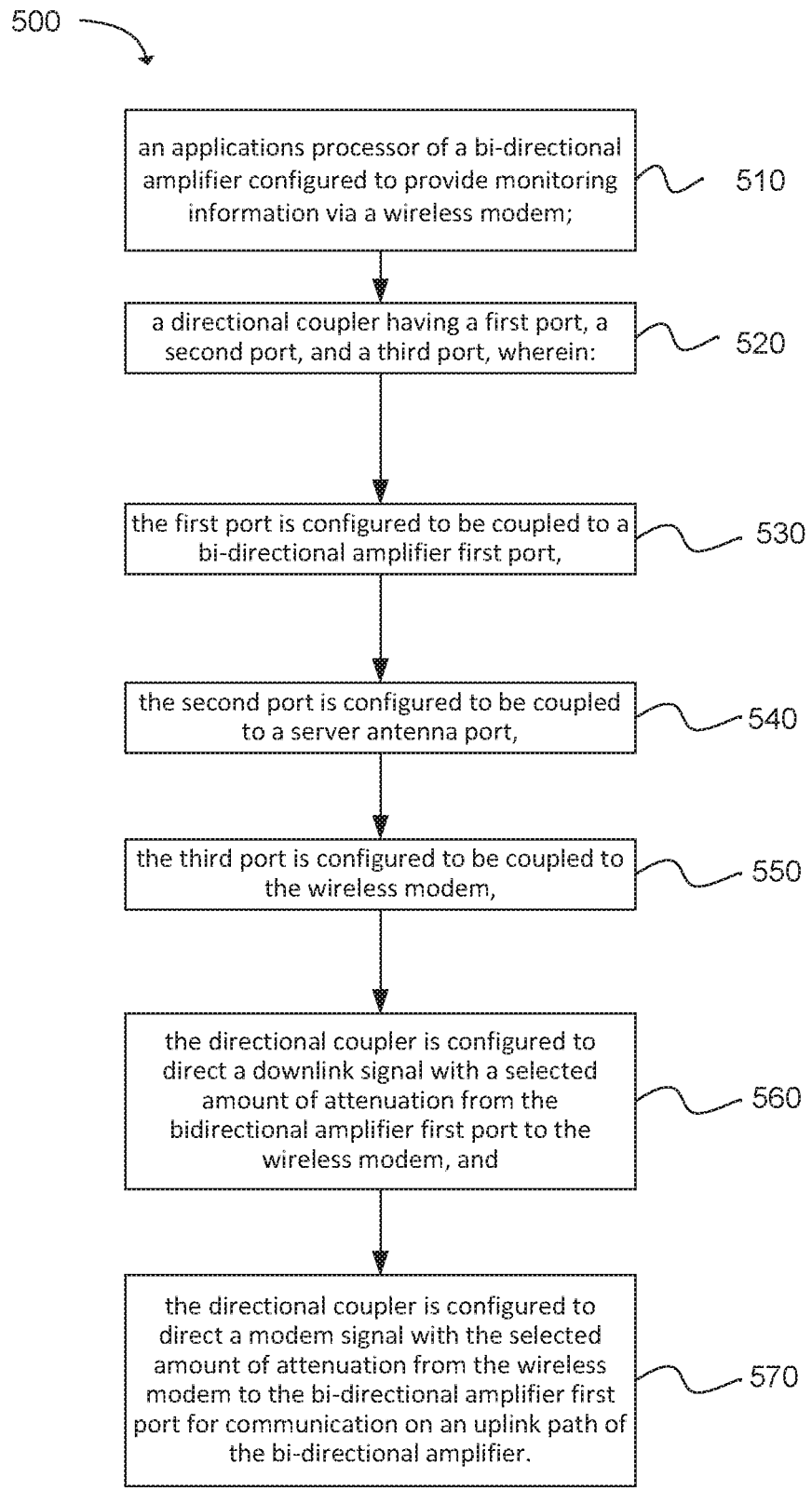
FIG. 5 depicts a bi-directional amplifier remote monitoring system in accordance with an example.

Another example provides a bi-directional amplifier remote monitoring system 500, as shown in the flow chart in FIG. 5. The bi-directional amplifier remote monitoring system comprises an applications processor of a bi-directional amplifier configured to provide monitoring information via a wireless modem, as shown in block 510. The bi-directional amplifier remote monitoring system further comprises a directional coupler having a first port, a second port, and a third port, as shown in block 520. The bi-directional amplifier remote monitoring system further comprises that the first port is configured to be coupled to a bi-directional amplifier first port, as shown in block 530. The bi-directional amplifier remote monitoring system further comprises that the second port is configured to be coupled to a server antenna port, as shown in block 540. The bi-directional amplifier remote monitoring system further comprises that the third port is configured to be coupled to the wireless modem, as shown in block 550. The bi-directional amplifier remote monitoring system further comprises that the directional coupler is configured to direct a downlink signal with a selected amount of attenuation from the bidirectional amplifier first port to the wireless modem, as shown in block 560. The bi-directional amplifier remote monitoring system further comprises that the directional coupler is configured to direct a modem signal with the selected amount of attenuation from the wireless modem to the bi-directional amplifier first port for communication on an uplink path of the bi-directional amplifier, as shown in block 570.

Figure 6:
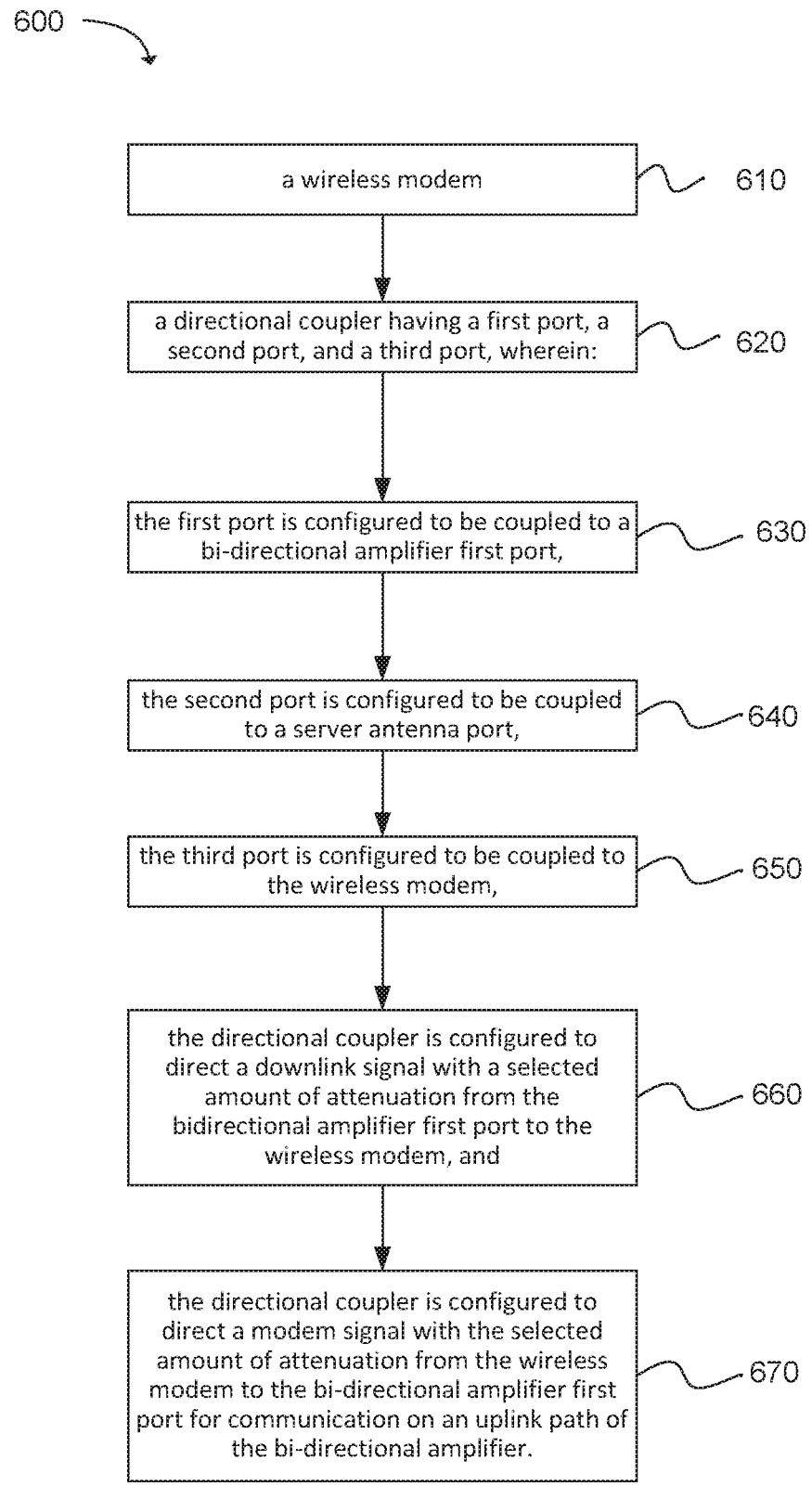
FIG. 6 depicts a bi-directional amplifier remote monitoring system in accordance with an example.

Another example provides a bi-directional amplifier remote monitoring system 600, as shown in the flow chart in FIG. 6. The bi-directional amplifier remote monitoring system comprises a wireless modem, as shown in block 610. The bi-directional amplifier remote monitoring system further comprises a directional coupler having a first port, a second port, and a third port, as shown in block 620. The bi-directional amplifier remote monitoring system further comprises that the first port is configured to be coupled to a bi-directional amplifier first port, as shown in block 630. The bi-directional amplifier remote monitoring system further comprises that the second port is configured to be coupled to a server antenna port, as shown in block 640. The bi-directional amplifier remote monitoring system further comprises that the third port is configured to be coupled to the wireless modem, as shown in block 650. The bi-directional amplifier remote monitoring system further comprises that the directional coupler is configured to direct a downlink signal with a selected amount of attenuation from the bidirectional amplifier first port to the wireless modem, as shown in block 660. The bi-directional amplifier remote monitoring system further comprises that the directional coupler is configured to direct a modem signal with the selected amount of attenuation from the wireless modem to the bi-directional amplifier first port for communication on an uplink path of the bi-directional amplifier, as shown in block 670.

Figure 7:
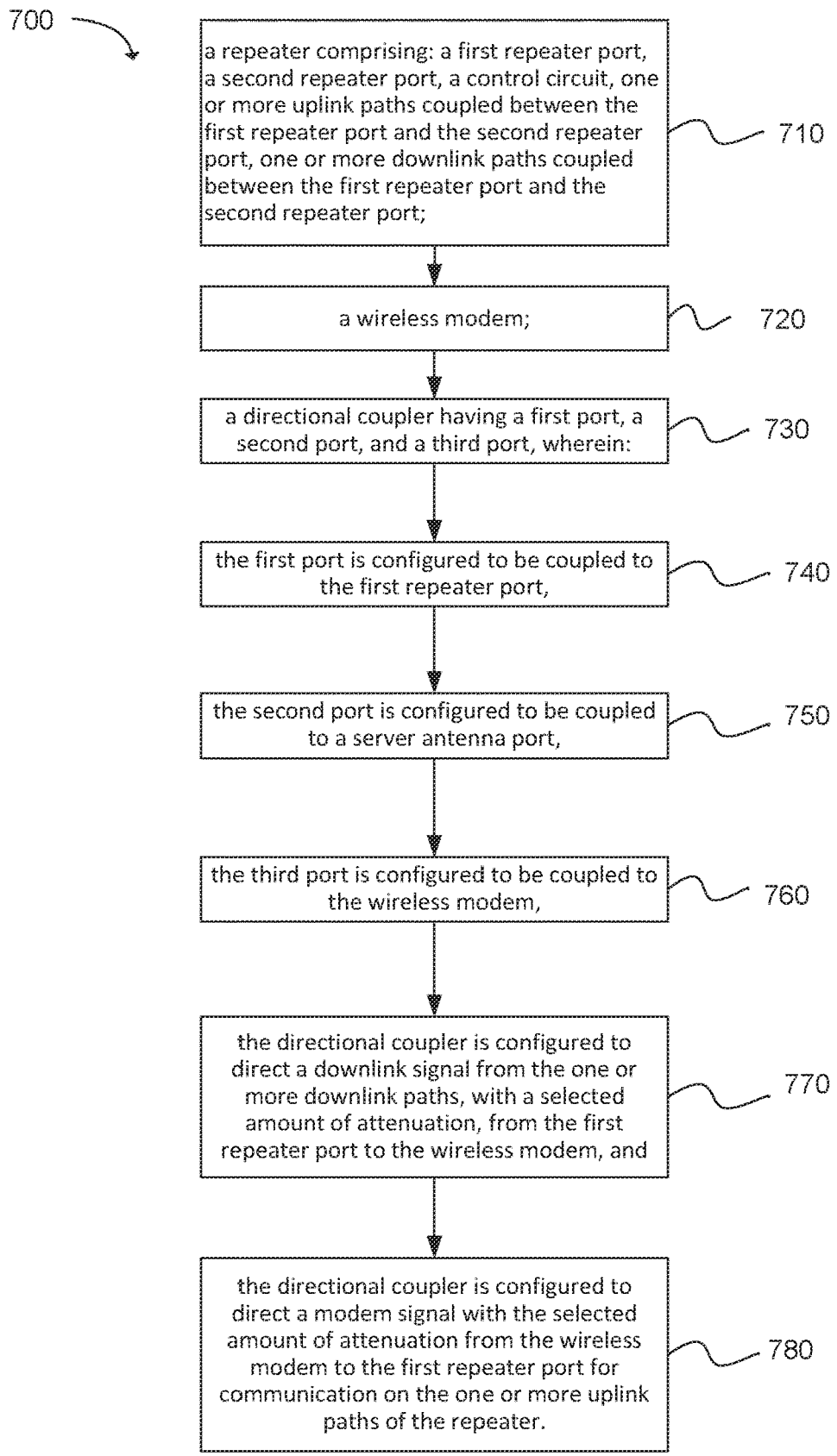
FIG. 7 depicts a bi-directional amplifier (BDA) with remote monitoring capability in accordance with an example.

Another example provides a bi-directional amplifier (BDA) with remote monitoring capability 700, as shown in the flow chart in FIG. 7. The BDA comprises a repeater comprising: a first repeater port, a second repeater port, a control circuit, one or more uplink paths coupled between the first repeater port and the second repeater port, one or more downlink paths coupled between the first repeater port and the second repeater port, as shown in block 710. The BDA further comprises a wireless modem, as shown in block 720. The BDA further comprises a directional coupler having a first port, a second port, and a third port, as shown in block 730. The BDA further comprises that the first port is configured to be coupled to the first repeater port, a shown in block 740. The BDA further comprises that the second port is configured to be coupled to a server antenna port, as shown in block 750. The apparatus further comprises that the third port is configured to be coupled to the wireless modem, as shown in block 760. The BDA further comprises the directional coupler is configured to direct a downlink signal from the one or more downlink paths, with a selected amount of attenuation, from the first repeater port to the wireless modem, as shown in block 770. The BDA further comprises the directional coupler is configured to direct a modem signal with the selected amount of attenuation from the wireless modem to the first repeater port for communication on the one or more uplink paths of the repeater, as shown in block 780.

EXAMPLES

The following examples pertain to specific technology embodiments and point out specific features, elements, or actions that can be used or otherwise combined in achieving such embodiments.

Example 1

Includes a bi-directional amplifier remote monitoring system, comprising: an applications processor of a bi-directional amplifier configured to provide monitoring information via a wireless modem; and a directional coupler having a first port, a second port, and a third port, wherein: the first port is configured to be coupled to a bi-directional amplifier first port, the second port is configured to be coupled to a server antenna port, the third port is configured to be coupled to the wireless modem, the directional coupler is configured to direct a downlink signal with a selected amount of attenuation from the bidirectional amplifier first port to the wireless modem, and the directional coupler is configured to direct a modem signal with the selected amount of attenuation from the wireless modem to the bi-directional amplifier first port for communication on an uplink path of the bi-directional amplifier.

Example 2

Includes the bi-directional amplifier remote monitoring system of Example 1, wherein the wireless modem is configured to be electrically connected to the bi-directional amplifier to enable the modem to send data to the bi-directional amplifier and receive data from the bi-directional amplifier.

Example 3

Includes the bi-directional amplifier remote monitoring system of Example 1, further comprising an attenuator coupled between the third port of the directional coupler and the wireless modem to provide a selected amount of attenuation of the modem signal and the downlink signal.

Example 4

Includes the bi-directional amplifier remote monitoring system of Example 3, wherein the attenuator provides an attenuation of greater than or equal to 10 decibels (dB).

Example 5

Includes the bi-directional amplifier remote monitoring system of Example 1, wherein the directional coupler provides an attenuation of greater than or equal to 10 decibels (dB).

Example 6

Includes the bi-directional amplifier remote monitoring system of Example 1, wherein the directional coupler is configured to substantially pass an uplink signal, received from the server antenna, from the second port of the directional coupler to the first port of the directional coupler to enable the uplink signal to be communicated through the directional coupler to the bi-directional amplifier first port with minimal loss.

Example 7

Includes the bi-directional amplifier remote monitoring system of Example 1, wherein the bi-directional amplifier is configured to pass multiple bands on a downlink signal or multiple bands on an uplink signal.

Example 8

Includes a bi-directional amplifier remote monitoring system, comprising: a wireless modem; and a directional coupler having a first port, a second port, and a third port, wherein: the first port is configured to be coupled to a bi-directional amplifier first port, the second port is configured to be coupled to a server antenna port, the third port is configured to be coupled to the wireless modem, the directional coupler is configured to direct a downlink signal with a selected amount of attenuation from the bidirectional amplifier first port to the wireless modem, and the directional coupler is configured to direct a modem signal with the selected amount of attenuation from the wireless modem to the bi-directional amplifier first port for communication on an uplink path of the bi-directional amplifier.

Example 9

Includes the bi-directional amplifier remote monitoring system of Example 8, wherein the wireless modem is configured to be electrically connected to the bi-directional amplifier to enable the modem to send data to the bi-directional amplifier and receive data from the bi-directional amplifier.

Example 10

Includes the bi-directional amplifier remote monitoring system of Example 8, further comprising an attenuator coupled between the third port of the directional coupler and the wireless modem to provide a selected amount of attenuation of the modem signal and the downlink signal.

Example 11

Includes the bi-directional amplifier remote monitoring system of Example 10, wherein the attenuator provides an attenuation of greater than or equal to 10 decibels (dB).

Example 12

Includes the bi-directional amplifier remote monitoring system of Example 8, wherein the directional coupler provides an attenuation of greater than or equal to 10 decibels (dB).

Example 13

Includes the bi-directional amplifier remote monitoring system of Example 8, wherein the directional coupler is configured to substantially pass an uplink signal, received from the server antenna, from the second port of the directional coupler to the first port of the directional coupler to enable the uplink signal to be communicated through the directional coupler to the bi-directional amplifier first port with minimal loss.

Example 14

Includes the bi-directional amplifier remote monitoring system of Example 8, wherein the bi-directional amplifier is configured to pass multiple bands on a downlink signal or multiple bands on an uplink signal.

Example 15

Includes a bi-directional amplifier (BDA) with remote monitoring capability, comprising: a repeater comprising: a first repeater port, a second repeater port, a control circuit, one or more uplink paths coupled between the first repeater port and the second repeater port, one or more downlink paths coupled between the first repeater port and the second repeater port, a wireless modem; and a directional coupler having a first port, a second port, and a third port, wherein: the first port is configured to be coupled to the first repeater port, the second port is configured to be coupled to a server antenna port, the third port is configured to be coupled to the wireless modem, the directional coupler is configured to direct a downlink signal from the one or more downlink paths, with a selected amount of attenuation, from the first repeater port to the wireless modem, and the directional coupler is configured to direct a modem signal with the selected amount of attenuation from the wireless modem to the first repeater port for communication on the one or more uplink paths of the repeater.

Example 16

Includes the BDA with remote monitoring capability of Example 15, wherein the wireless modem is configured to be electrically connected to the repeater to enable the modem to send data to the control circuit and receive data from the control circuit.

Example 17

Includes the BDA with remote monitoring capability of Example 15, further comprising an attenuator coupled between the third port of the directional coupler and the wireless modem to provide a selected amount of attenuation of the modem signal and the downlink signal.

Example 18

Includes the BDA with remote monitoring capability of Example 17, wherein the attenuator provides an attenuation of greater than or equal to 10 decibels (dB).

Example 19

Includes the BDA with remote monitoring capability of Example 15, wherein the directional coupler provides an attenuation of greater than or equal to 10 decibels (dB).

Example 20

Includes the BDA with remote monitoring capability of Example 15, wherein the directional coupler is configured to substantially pass an uplink signal, received from the server antenna, from the second port of the directional coupler to the first port of the directional coupler to enable the uplink signal to be communicated through the directional coupler to the first repeater port with minimal loss.

Example 21

Includes the BDA with remote monitoring capability of Example 15, wherein the bi-directional amplifier is configured to pass multiple bands on a downlink signal or multiple bands on an uplink signal.

Example 22

Includes a repeater remote monitoring system, comprising: an applications processor of a repeater configured to provide monitoring information via a wireless modem; and a directional coupler having at least a first port, a second port, and a third port, wherein: the first port is configured to be coupled to a repeater first port, the second port is configured to be coupled to a server antenna port, the third port is configured to be coupled to the wireless modem, and the directional coupler is configured to couple a modem signal from the wireless modem with an uplink signal at the repeater first port for communication via an uplink path of the repeater for transmission to the base station.

Example 23

Includes the repeater remote monitoring system of Example 22, wherein the directional coupler is configured to couple a downlink signal, that is received from a base station, from the repeater first port to the wireless modem, and wherein the downlink signal is coupled with a selected amount of attenuation.

Example 24

Includes the repeater remote monitoring system of Example 22, wherein the wireless modem is configured to be communicatively coupled to the repeater to enable the modem to send data to the repeater and receive data from the repeater.

Example 25

Includes the repeater remote monitoring system of Example 22, further comprising an attenuator coupled between the third port of the directional coupler and the wireless modem, wherein the attenuator is configured to provide a selected amount of attenuation of the modem signal or a downlink signal received from a base station.

Example 26

Includes the repeater remote monitoring system of Example 26, wherein one or more of the attenuator or the directional coupler is configured to provide an attenuation of greater than or equal to 10 decibels (dB).

Example 27

Includes the repeater remote monitoring system of Example 26, wherein one or more of the attenuator or the directional coupler is configured to reduce a maximum gain of a downlink signal from the repeater to a level in accordance with a regulatory body's requirements.

Example 28

Includes the repeater remote monitoring system of Example 26, wherein one or more of the attenuator or the directional coupler is configured to reduce a maximum gain of a downlink signal from the repeater to 15 decibels (dB).

Example 29

Includes the repeater remote monitoring system of Example 22, wherein the directional coupler is configured to substantially pass an uplink signal, received from the server antenna, from the second port of the directional coupler to the first port of the directional coupler to enable the uplink signal to be communicated through the directional coupler to the repeater first port with minimal loss.

Example 30

Includes the repeater remote monitoring system of Example 22, wherein the repeater is configured to pass multiple bands on a downlink signal or multiple bands on an uplink signal.

Example 31

Includes the repeater remote monitoring system of Example 22, wherein the monitoring information includes one or more of: baseband data packets, firmware version information, booster identification information, user configuration information, heartbeat information, a radio frequency (RF) status, path status information, path output power, downlink path received signal strength indicator (RSSI), band oscillation count, uptime, oscillation status, alerts, power reset information, oscillation detected information, RF band shutdown detected information, hardware error detected information, automatic gain control (AGC) active information, remote configuration change information, local configuration change information, or button press information.

Example 32

Includes a repeater remote monitoring system, comprising: a repeater; a wireless modem; and a directional coupler having a first port, a second port, and a third port, wherein: the first port is configured to be coupled to a repeater first port, the second port is configured to be coupled to a server antenna port, the third port is configured to be coupled to the wireless modem, the directional coupler is configured to couple a modem signal from the wireless modem with an uplink signal at the repeater first port for communication via an uplink path of the repeater for transmission to the base station.

Example 33

Includes the repeater remote monitoring system of Example 32, wherein the directional coupler is configured to couple a downlink signal, that is received from a base station, from the repeater first port to the wireless modem, and wherein the downlink signal is coupled with a selected amount of attenuation.

Example 34

Includes the repeater remote monitoring system of Example 32, wherein the wireless modem is configured to be communicatively coupled to the repeater to enable the modem to send data to the repeater and receive data from the repeater.

Example 35

Includes the repeater remote monitoring system of Example 32, further comprising an attenuator coupled between the third port of the directional coupler and the wireless modem, wherein the attenuator is further configured to provide a selected amount of attenuation of the transmitted uplink modem signal or the received downlink base station signal.

Example 36

Includes the repeater remote monitoring system of Example 35, wherein one or more of the attenuator or the directional coupler is configured to provide an attenuation of greater than or equal to 10 decibels (dB).

Example 37

Includes the repeater remote monitoring system of Example 35, wherein one or more of the attenuator or the directional coupler is configured to reduce a maximum gain of a downlink signal from the repeater to a level in accordance with a regulatory body's requirements.

Example 38

Includes the repeater remote monitoring system of Example 35, wherein one or more of the attenuator or the directional coupler is configured to reduce a maximum gain of a downlink signal from the repeater to 15 decibels (dB).

Example 39

Includes the repeater remote monitoring system of Example 32, wherein the directional coupler is configured to substantially pass an uplink signal, received from the server antenna, from the second port of the directional coupler to the first port of the directional coupler to enable the uplink signal to be communicated through the directional coupler to the repeater first port with minimal loss.

Example 40

Includes the repeater remote monitoring system of Example 32, wherein the repeater is configured to pass multiple bands on a downlink signal or multiple bands on an uplink signal.

Example 41

Includes a repeater with remote monitoring capability, comprising: a repeater comprising: a first repeater port, a second repeater port, a control circuit, one or more uplink paths coupled between the first repeater port and the second repeater port, and one or more downlink paths coupled between the first repeater port and the second repeater port; a wireless modem; and a directional coupler configured to couple a modem signal from the wireless modem with an uplink signal at the first repeater port for communication via an uplink path of the repeater for transmission to a base station.

Example 42

Includes the repeater with remote monitoring capability of Example 41, wherein the directional coupler comprises a first port, a second port, and a third port, wherein: the first port is configured to be coupled to the first repeater port, the second port is configured to be coupled to a server antenna port, and the third port is configured to be coupled to the wireless modem.

Example 43

Includes the repeater with remote monitoring capability of Example 41, wherein the directional coupler is configured to couple a downlink signal, that is received from a base station, from the first repeater port to the wireless modem, and wherein the downlink signal is coupled with a selected amount of attenuation.

Example 44

Includes the repeater with remote monitoring capability of Example 41, wherein the wireless modem is configured to be communicatively coupled to the repeater to enable the modem to send data to the control circuit and receive data from the control circuit.

Example 45

Includes the repeater with remote monitoring capability of Example 42, further comprising an attenuator coupled between the third port of the directional coupler and the wireless modem, wherein the attenuator is configured to provide a selected amount of attenuation of the transmitted uplink modem signal or the received downlink base station signal.

Example 46

Includes the repeater with remote monitoring capability of Example 45, wherein one or more of the attenuator or the directional coupler is configured to provide an attenuation of greater than or equal to 10 decibels (dB).

Example 47

Includes the repeater with remote monitoring capability of Example 45, wherein one or more of the attenuator or the directional coupler is configured to reduce a maximum gain of a downlink signal from the repeater to a level in accordance with a regulatory body's requirements.

Example 48

Includes the repeater with remote monitoring capability of Example 45, wherein one or more of the attenuator or the directional coupler is configured to reduce a maximum gain of a downlink signal from the repeater to 15 decibels (dB).

Example 49

Includes the repeater with remote monitoring capability of Example 42, wherein the directional coupler is configured to substantially pass an uplink signal, received from the server antenna, from the second port of the directional coupler to the first port of the directional coupler to enable the uplink signal to be communicated through the directional coupler to the first repeater port with minimal loss.

Example 50

Includes the repeater with remote monitoring capability of Example 41, wherein the repeater is configured to pass multiple bands on a downlink signal or multiple bands on an uplink signal.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater remote monitoring system, comprising:
   an applications processor of a repeater configured to provide monitoring information via a wireless modem; and
   a directional coupler having at least a bidirectional first port, a bidirectional second port, and a bidirectional third port, wherein:
   the bidirectional first port is configured to be coupled to a repeater first port,
   the bidirectional second port is configured to be coupled to a server antenna port,
   the bidirectional third port is configured to be coupled to the wireless modem, and
   the directional coupler is configured to couple:
   a modem signal from the wireless modem with an uplink signal at the repeater first port for communication via an uplink path of the repeater to a donor antenna port for transmission to the base station; and
   a downlink signal from the repeater first port to the wireless modem.

2. The repeater remote monitoring system of claim 1, wherein the downlink signal is: received from a base station at the donor antenna port and; coupled with a selected amount of attenuation between the directional coupler and the wireless modem.

3. The repeater remote monitoring system of claim 1, wherein the wireless modem is configured to be communicatively coupled to the repeater to enable the modem to send data to the repeater and receive data from the repeater.

4. The repeater remote monitoring system of claim 1, further comprising an attenuator coupled between the bidirectional third port of the directional coupler and the wireless modem, wherein the attenuator is configured to provide a selected amount of attenuation of the modem signal or a downlink signal received from a base station.

5. The repeater remote monitoring system of claim 4, wherein one or more of the attenuator or the directional coupler is configured to provide an attenuation of greater than or equal to 10 decibels (dB).

6. The repeater remote monitoring system of claim 4, wherein one or more of the attenuator or the directional coupler is configured to reduce a maximum gain of a downlink signal output from the repeater to a level in accordance with a regulatory body's requirements.

7. The repeater remote monitoring system of claim 4, wherein one or more of the attenuator or the directional coupler is configured to reduce a maximum gain of a downlink signal output from the repeater to 15 decibels (dB).

8. The repeater remote monitoring system of claim 1, wherein the directional coupler is configured to substantially pass an uplink signal, received from the server antenna, from the bidirectional second port of the directional coupler to the bidirectional first port of the directional coupler to enable the uplink signal to be communicated through the directional coupler to the repeater first port with minimal loss.

9. The repeater remote monitoring system of claim 1, wherein the repeater is configured to pass multiple bands on a downlink signal or multiple bands on an uplink signal.

10. The repeater remote monitoring system of claim 1, wherein the monitoring information includes one or more of:
baseband data packets, firmware version information, booster identification information, user configuration information, heartbeat information, a radio frequency (RF) status, path status information, path output power, downlink path received signal strength indicator (RSSI), band oscillation count, uptime, oscillation status, alerts, power reset information, oscillation detected information, RF band shutdown detected information, hardware error detected information, automatic gain control (AGC) active information, remote configuration change information, local configuration change information, or button press information.

11. A repeater remote monitoring system, comprising:
a repeater;
a wireless modem; and
a directional coupler having a bidirectional first port, a bidirectional second port, and a bidirectional third port, wherein:
the bidirectional first port is configured to be coupled to a repeater first port,
the bidirectional second port is configured to be coupled to a server antenna port,
the bidirectional third port is configured to be coupled to the wireless modem,
the directional coupler is configured to couple:
a modem signal from the wireless modem with an uplink signal at the repeater first port for communication via an uplink path of the repeater to a donor antenna port for transmission to a base station; and
a downlink signal from the repeater first port to the wireless modem.

12. The repeater remote monitoring system of claim 11, wherein the third port is the bidirectional third port and the directional coupler is configured to couple the downlink signal, that is received from a base station at the donor antenna port, from the repeater first port to the wireless modem, and wherein the downlink signal is coupled with a selected amount of attenuation between the directional coupler and the wireless modem.

13. The repeater remote monitoring system of claim 11, wherein the wireless modem is configured to be communicatively coupled to the repeater to enable the modem to send data to the repeater and receive data from the repeater.

14. The repeater remote monitoring system of claim 11, further comprising an attenuator coupled between the third port of the directional coupler and the wireless modem, wherein the attenuator is further configured to provide a selected amount of attenuation of the transmitted uplink modem signal or the received downlink base station signal.

15. The repeater remote monitoring system of claim 14, wherein one or more of the attenuator or the directional coupler is configured to provide an attenuation of greater than or equal to 10 decibels (dB).

16. The repeater remote monitoring system of claim 14, wherein one or more of the attenuator or the directional coupler is configured to reduce a maximum gain of a downlink signal output from the repeater to a level in accordance with a regulatory body's requirements.

17. The repeater remote monitoring system of claim 14, wherein one or more of the attenuator or the directional coupler is configured to reduce a maximum gain of a downlink signal output from the repeater to 15 decibels (dB).

18. The repeater remote monitoring system of claim 11, wherein the directional coupler is configured to substantially pass an uplink signal, received from the server antenna, from the bidirectional second port of the directional coupler to the bidirectional first port of the directional coupler to enable the uplink signal to be communicated through the directional coupler to the repeater first port with minimal loss.

19. The repeater remote monitoring system of claim 11, wherein the repeater is configured to pass multiple bands on a downlink signal or multiple bands on an uplink signal.

20. A repeater with remote monitoring capability, comprising:
a bidirectional repeater comprising:
a bidirectional first repeater port,
a bidirectional second repeater port,
a control circuit,
one or more uplink paths coupled between the bidirectional first repeater port and the bidirectional second repeater port, and
one or more downlink paths coupled between the bidirectional first repeater port and the bidirectional second repeater port;
a wireless modem; and
a directional coupler configured to couple:
a modem signal from the wireless modem with an uplink signal at the bidirectional first repeater port for communication via an uplink path of the bidirectional repeater to a donor antenna port for transmission to a base station, and
a downlink signal from the repeater first port to the wireless modem,
wherein the directional coupler comprises a bidirectional first port, a bidirectional second port, and a bidirectional third port.

21. The repeater with remote monitoring capability of claim 20, wherein:
the bidirectional first port is configured to be coupled to the bidirectional first repeater port,
the bidirectional second port is configured to be coupled to a server antenna port, and
the bidirectional third port is configured to be coupled to the wireless modem.

22. The repeater with remote monitoring capability of claim 20, wherein the directional coupler is configured to couple the downlink signal, that is received from a base station at the donor antenna port, from the bidirectional first repeater port to the wireless modem, and wherein the downlink signal is coupled with a selected amount of attenuation between the directional coupler and the wireless modem.

23. The repeater with remote monitoring capability of claim 20, wherein the wireless modem is configured to be communicatively coupled to the repeater to enable the modem to send data to the control circuit and receive data from the control circuit.

24. The repeater with remote monitoring capability of claim 21, further comprising an attenuator coupled between the bidirectional third port of the directional coupler and the wireless modem, wherein the attenuator is configured to provide a selected amount of attenuation of the transmitted uplink modem signal or the received downlink base station signal.

25. The repeater with remote monitoring capability of claim 24, wherein one or more of the attenuator or the directional coupler is configured to provide an attenuation of greater than or equal to 10 decibels (dB).

26. The repeater with remote monitoring capability of claim 24, wherein one or more of the attenuator or the directional coupler is configured to reduce a maximum gain of a downlink signal output from the repeater to a level in accordance with a regulatory body's requirements.

27. The repeater with remote monitoring capability of claim 24, wherein one or more of the attenuator or the directional coupler is configured to reduce a maximum gain of a downlink signal output from the repeater to 15 decibels (dB).

28. The repeater with remote monitoring capability of claim 21, wherein the directional coupler is configured to substantially pass an uplink signal, received from the server antenna, from the bidirectional second port of the directional coupler to the bidirectional first port of the directional coupler to enable the uplink signal to be communicated through the directional coupler to the bidirectional first repeater port with minimal loss.

29. The repeater with remote monitoring capability of claim 20, wherein the repeater is configured to pass multiple bands on a downlink signal or multiple bands on an uplink signal.

* * * * *